United States Patent [19]
Zucker

[11] Patent Number: 5,819,467
[45] Date of Patent: Oct. 13, 1998

[54] METHOD OF STIMULATING PLANT GROWTH

[76] Inventor: Jonathan M. Zucker, 16 Buckingham Dr., Charleston, S.C. 29407

[21] Appl. No.: 769,304

[22] Filed: Dec. 19, 1996

Related U.S. Application Data

[63] Continuation-in-part of Ser. No. 349,722, Dec. 5, 1994, abandoned.

[51] Int. Cl.⁶ .............................. A01C 1/00; A47G 7/02; A01G 5/00; A01G 31/00
[52] U.S. Cl. ........................... 47/1.3; 47/40.5; 47/41.01; 47/41.11; 47/59; 47/60; 47/62
[58] Field of Search ..................... 47/1.3, 40.5, 41.01, 47/41.11, 59, 60, 62

[56] References Cited

U.S. PATENT DOCUMENTS 5,464,456  11/1995  Kertz .......................................... 47/1.3

*Primary Examiner*—Dian C. Jacobson
*Assistant Examiner*—Tekchand Saidha
*Attorney, Agent, or Firm*—Juettner Pyle Piontek & Underwood

[57] ABSTRACT

A conductive helical coil is spaced around the stem of a growing plant, and alternating current is passed through the coil to induce an electromotive force in the stem and stimulate growth.

1 Claim, 1 Drawing Sheet

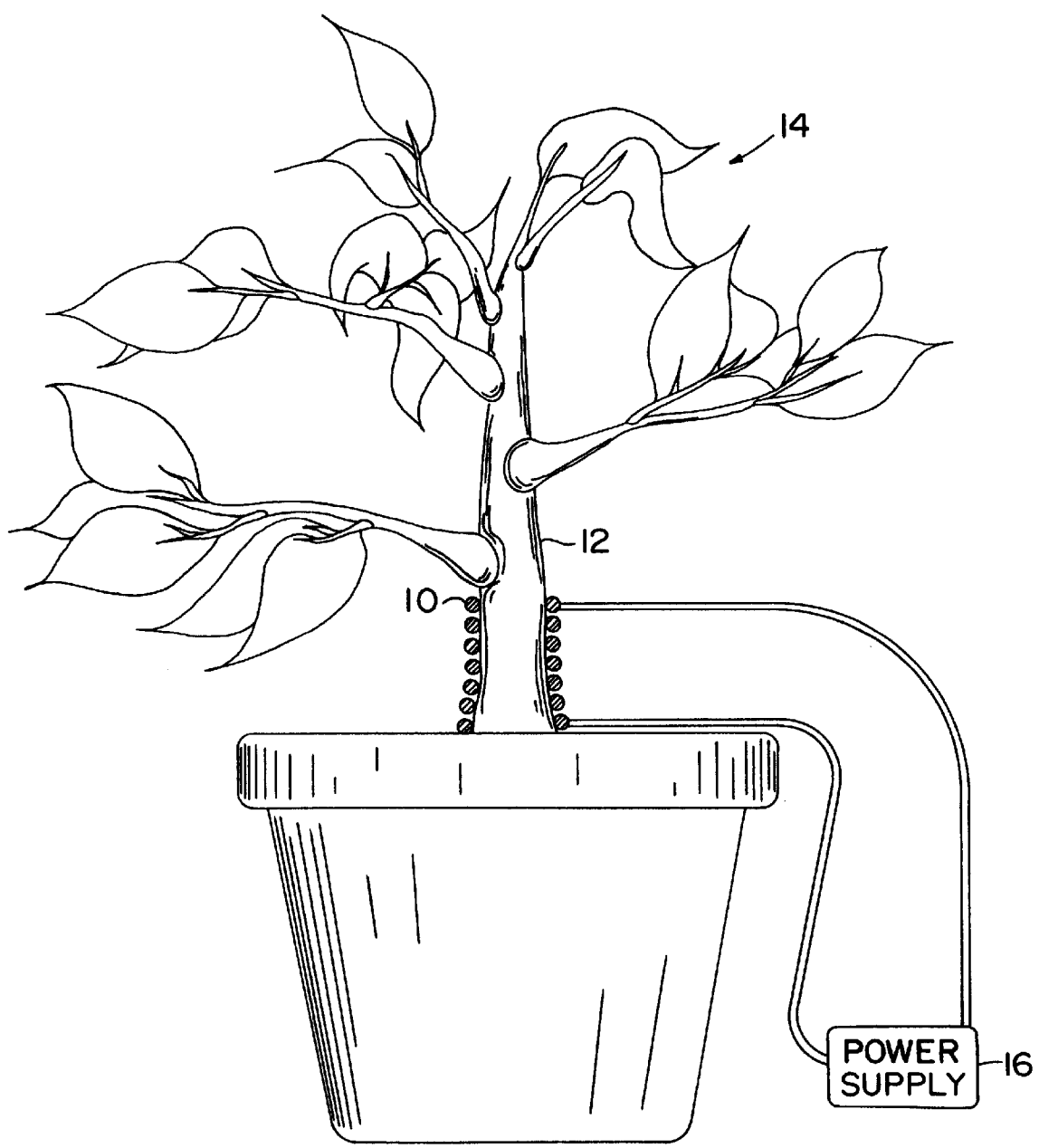

METHOD OF STIMULATING PLANT GROWTH

CROSS-REFERENCE

This application is a continuation-in-part of application Ser. No. 08/349,722, filed Dec. 5, 1994, now abandoned.

BACKGROUND OF THE INVENTION

This invention relates to the regulation of plant growth by electromotive forces, particularly induced electromagnetic forces.

It is generally known that many types of life forces are affected by electrical phenomena. For example, proposals have been made to pass electrical current through the soil to regulate the growth of plants.

SUMMARY OF THE INVENTION

It has been found that passage of alternating current through a coil disposed closely around the stem of a living plant, and thereby subjecting the plant stem of induced EMF, results in significant modification of growing characteristics, with the plant growing taller and larger, with more numerous and larger leaves, under otherwise normal growing conditions.

BRIEF DESCRIPTION OF THE DRAWING

FIG. 1. An elevational view of a plant having a coil around the stem and connected to a current supply.

DESCRIPTION OF THE PREFERRED EMBODIMENTS

As shown in FIG. 1, a helical conductive coil, generally indicated at 10 and shown in vertical cross-section is disposed around the stem 12 of a growing plant 14 above ground level, with the ends of the coil 10 being connected to a source of alternating current 16 at low amperage. The coil may be preformed on a tubular form in the shape of a helix and may be provided with an inner and outer support to be shape retaining. The coil may be placed around the plant shortly after germination. In the alternative, a coil may be wound around the stem or base of a plant beneath the foliage. The distance between the coil and stem is preferably kept at a minimum, with the radial distance between the plant stem and newly installed coil being less than four inches and most preferably, less than one inch.

The number of turns employed in the coil 10 has not been found to be critical. Also, the use of low currents are sufficient to significantly alter the growth characteristics of the plants tested, and current flow in the order of from at least 0.5 and preferably from about 0.5 to 3.5 amp turns has been found to be sufficient, with the term "amp turns" being defined as the number of loops in the coil multiplied by the current amperes. The coil is preferably activated continuously but also may be activated on a periodic basis.

Upon activation of the current supply source 16, alternating current is applied to the coil 10 to provide a field around the coil and induced EMF to the stem of the plant. It is believed that the induced EMF causes enhanced electromagnetic pumping of nutrients in ionic form through the stem and into the leaves and also increases ionic interactive chemical activity.

In comparison with plants grown under the same conditions and time period, which receive no exposure to electrical stimulation, plants treated by the process of the present invention are taller and fuller, with more dense foliage, larger leaves and more layers of leaves.

Potential uses of the present invention, for example, include accelerated hydroponic or greenhouse growth of fruits, flowers and vegetables, accelerated germination of seeds and initial growth of transportable seedlings, and controlled growth of plants in commercial or residential environments.

In the case of newly germinated seeds, improvements in growth characteristics and leaf and branch development become noticeable in several days, and the EMF treatment can continue until the seedlings are ready for replanting, usually within several weeks. While rapid development of seedlings and small plants under controlled conditions is a preferred application, the treatment is believed to be applicable to all plants having roots and a stem allowing deployment of the helical coil.

In further illustration of the present invention, the following example is given.

EXAMPLE I

Eighteen induction coils having ten loops of #124 gauge insulated wire (16 inches long) per coil were prepared. Thirty-two bean seeds of the same variety were planted in individual containers in the same batten of potting soil and placed under artificial light sources (light bulbs) such that the plantings would receive the same degree of light radiation on a continuous basis. Each of the plantings were provided with equal amounts of moisture and nutrients on a daily basis.

Of the above plantings, sixteen were used as controls and received no electrical stimulation. For the remainder, upon germination, a coil was placed around each seedling, and the ends of the coil were connected to a power supply providing an equal amount of alternating current to each coil at 60 Hz at about 2 amp turns. The coils for eight of the plants were provided with current in one direction and the coils for the others were provided with a current flow in the opposite direction.

The growth of the control plants were compared with the plants subjected to induced EMF over regular intervals. The EMF stimulated plants had a taller average height than the control plants and had more dense foliage with larger and more layers of leaves. The stimulated plants had at least 25% more leaves and branches than the control group after a two week period of growth under identical growing conditions.

I claim:

1. A method for stimulating the growth of a growing plant, said method comprising the steps of disposing a helical conductive coil having a number of turns around the stem of a plant within four inches of said stem, and passing an alternating electrical current through the coil in the order of about 0.5 to about 3.5 amp turns to produce an induced electromagnetic force in said stem and to stimulate growth of said plant.

\* \* \* \* \*